Figure 1:
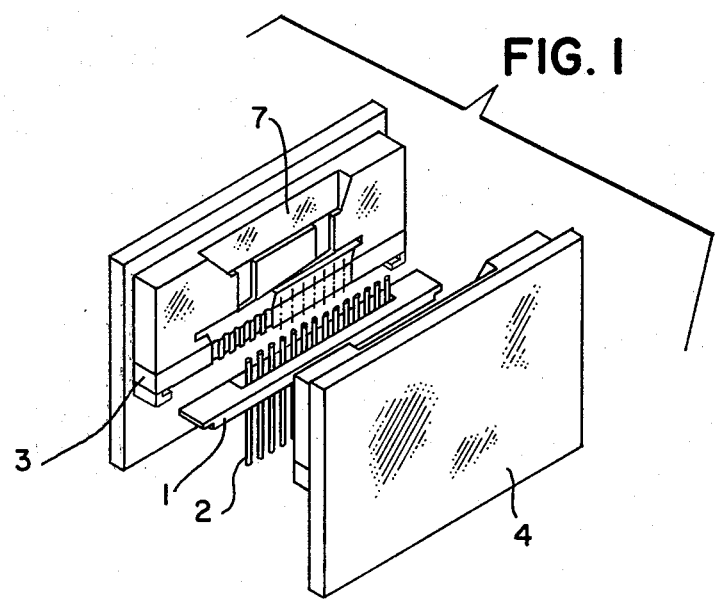

United States Patent [19]

Krug et al.

[11] 3,973,992
[45] Aug. 10, 1976

[54] TUBULAR ELECTRODE

[75] Inventors: Hans Krug, Kelkheim, Taunus; Hans Niklas, Eppstein, both of Germany; Rolf Thörnblad, Hultsfred, Sweden

[73] Assignee: Varta Batterie Aktiengesellschaft, Hanover, Germany

[22] Filed: May 28, 1974

[21] Appl. No.: 473,409

[30] Foreign Application Priority Data
Sept. 24, 1973 Germany............................ 2347957

[52] U.S. Cl..................................... 136/55; 136/66
[51] Int. Cl.²........................................ H01M 35/20
[58] Field of Search ................. 136/43, 53, 52, 54, 136/55, 57, 35, 65–66, 75, 36; 249/60; 29/2

[56] References Cited
UNITED STATES PATENTS

| | | | |
|---|---|---|---|
| 412,639 | 10/1889 | Lyte...................................... | 136/35 |
| 837,707 | 12/1906 | Mouterde .......................... | 136/35 X |
| 1,675,643 | 7/1928 | Dean et al. ........................ | 136/66 X |
| 2,026,193 | 12/1935 | Smith.................................. | 136/43 |

OTHER PUBLICATIONS

A.P.C. Application of L. J. Juman, Ser. No. 17,398, Published May 11, 1943.

*Primary Examiner*—Anthony Skapars
*Attorney, Agent, or Firm*—Weiser, Stapler & Spivak

[57] ABSTRACT

An electrode grid is formed of extruded spines onto whose ends a yoke is cast. The spines may be of lead or lead alloy, with a core of a more highly conductive material.

11 Claims, 4 Drawing Figures

TUBULAR ELECTRODE

This invention relates to a tubular electrode for electrode storage batteries, comprising grid rods interconnected by means of a grid yoke.

In the positive tubular plates of lead storage batteries, thin rods or spines serve as current conductors. These spines are positioned centrally within the tubes, which are generally formed of woven textile or glass fibers. Within these tubes, the spines are uniformly surrounded by active mass ($PbO_2$). The spines are joined at the upper ends of the plates to a yoke, which bears the lug through which the current is conducted to the battery terminal.

Storage batteries for traction applications require capacities of up to more than 1000 ah per cell. Because of the severely limited horizontal surface area which is normally available for such storage batteries, this leads to cell heights of up to about 700 mm, corresponding to plate heights of approximately 550 mm. In special cases, e.g., in submarine batteries, plate heights of appreciably more than 1000 mm are common.

In producing such electrodes, the grid spines and the grid yoke are simultaneously pressure cast in a mold. In conventional pressure casting machines, it has heretofore been economically feasible to make positive tubular electrode grids only with an antimony content of more than about 9%. For lower antimony content, it has been attempted to cast the grids in high-pressure casting machines. However, even this did not permit a material reduction of the antimony content. Furthermore, especially when very tall grids are being made, there is the danger of incomplete filling of the mold and porosity in the molded piece. The high antimony content which the molding art required to overcome these drawbacks, leads to antimony poisoning of the negative electrode which, in turn, results in high water consumption by the storage battery. This advantage could be overcome if grids of low antimony content could be used. However, as previously discussed, such grids cannot in practice be manufactured by conventional pressure casting machines.

Also, separately made yokes and spines have been united to each other by high frequency heating. This, too, has produced unsatisfactory grids.

Accordingly, it is an object of the invention to provide a tubular electrode for electric storage batteries which is easy to produce even with extremely large dimensions, and which is susceptible of being made of lead alloys having low antimony content and virtually any desired composition.

This, and other objects which will appear, are achieved in accordance with the invention by making the grid spines of extruded material, and uniting these spines electrically and mechanically by means of a grid yoke which has been made by casting.

Figure 2:
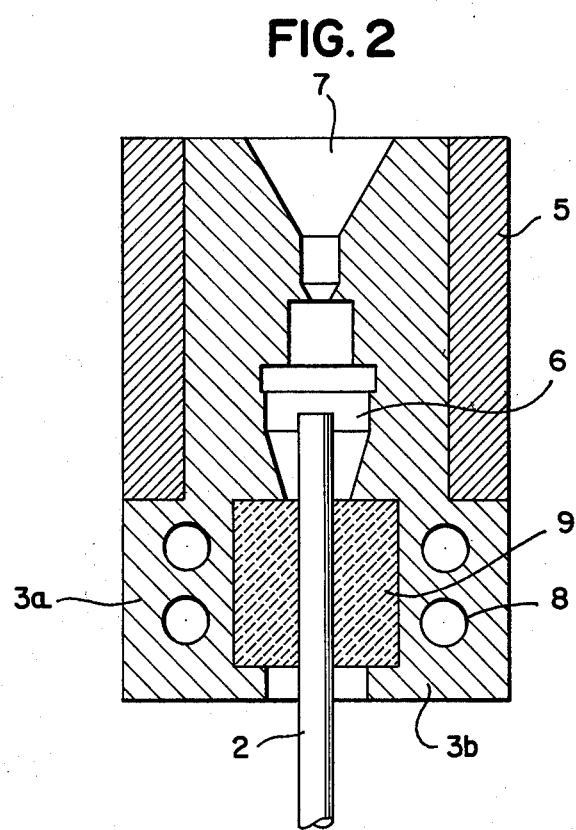
Figure 3:
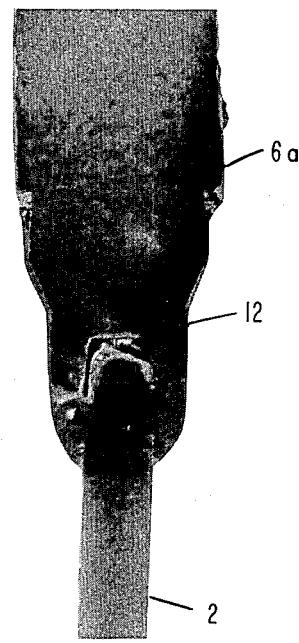
Figure 4:
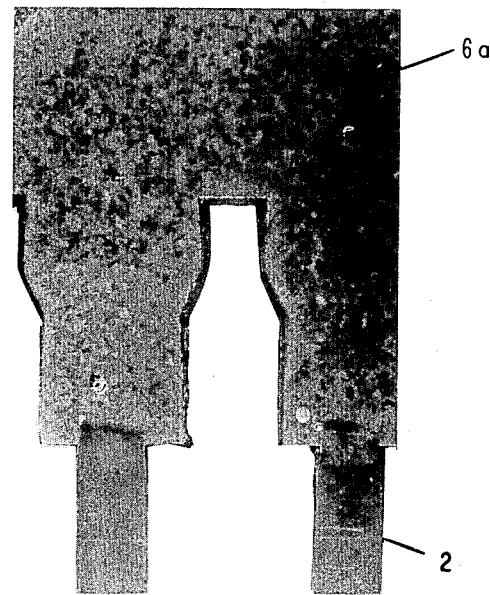

In making such grids by a casting-on process, the extruded spines, which have been cut to predetermined lengths, are cast within a grid yoke in a casting mold. A casting arrangement suitable for the production of such a tubular electrode is diagramatically illustrated in the accompanying drawings wherein FIG. 1 shows the casting mold in perspective;
FIG. 2 shows the mold in cross-section;
FIG. 3 shows a photograph, enlarged four-fold, of a section taken through the junction between a spine and yoke made in accordance with the prior art; and
FIG. 4 shows a corresponding photograph of an embodiment of the present invention.

The same numerals designate similar elements in the different figures.

Referring to FIGS. 1 and 2, the grid spines 2, made by extrusion and cut to a predetermined length, are clamped in a rack 1. The rack containing the spines is inserted into one side of the open form 3. The form is then closed and liquid lead is introduced into the form. After the melt has solidified, the form is reopened and the tubular electrode can be lifted out by means of the rack. After opening of the clamps of the rack, the finished grid can be taken out, at which time spines which may have become bent can be straightened.

Form 3 contains a suitable recess 6 for the current takeoff, as well as for ceramic inserts 9 which provide heat insulation for the extruded spines 2. In addition, cooling ducts 8 can be provided, as well as a heater body 5 for heating the two halves 3a and 3b of the form (mould).

By quenching the grids in water, the hardness of the yoke can be further enhanced. The arrangement described above is especially suitable for automatic manufacturing techniques. For example, four mould pairs can be arranged in a carousel, and spines can be inserted automatically into these moulds.

A special advantage derives from the fact that virtually any desired lead alloy can be used for casting the yoke, provided only its strength is sufficient for the subsequent processing. For example, antimony-poor alloys with antimony contents of only about 2.5 to 3.5% are suitable. Yokes of soft lead can easily be damaged during subsequent filling with active mass. The temperature of the melt used for casting depends on the antimony content of the extruded grid spines. At an antimony content of 3% this temperature should be between 450° and 500°C. For an antimony content of 3.5% it should lie between 400° and 450°C.

To improve the characteristics of the casting and the quality of the cast piece, the form can be provided with the usual mold release coatings. For example, it is advantageous to apply graphite containing coatings to a coating of low heat transmissivity. By means of heater body 5 the form can be maintained at optimum temperature, which lies between 180°C and 230°C. Care should be taken that the ends of the spines to be surrounded by the casting extend only a small distance into the form cavity, and come into contact with the melt only in a narrow region. For example, it may be desirable to allow the ends of the spines to extend only 2 millimeters into the cavity.

In principle, the extruded grid spines can also be made to advantage of any desired alloy which is suitable for extrusion molding. If spines of soft lead are used, there is the danger that the junction zone may not fuse completely. These difficulties decrease with increasing antimony content, leading to trouble-free fusing of the spines with the yoke. To obtain still further improvement of the junction it may be advantageous to treat the cut ends of the spines with a flux.

Use of extruded lead spines further makes it possible to use spines which contain wire-like inserts of a material providing better conductivity than lead. Any highly conductive metal can be used as such conductor material as, for example, aluminum, silver, copper, titanium, nickel, or alloys of several metals, brass or bronze. The choice may be made so that the lead forms an alloy with the conductor material at their interface. In most cases, however, an intimate mechanical contact suffices. Before cladding the conductor with lead, adhesion-enhancing coatings may be applied galvanically or in a thin layer from the melt which join the base material with the lead cladding in an alloy. To produce such spines with a core of more highly conductive material, processes can be used which are conventional in the cable industry. To this end, the conductive wires are introduced through suitably shaped injection nozzles into a cavity containing molten lead and then drawn out again through a second, wider aperture having a cooled nipple. In this way, the conductive wire becomes surrounded by a thick seamless coating of lead.

Under the conditions which prevail in a storage battery, it is especially desirable to use aluminum wire as the core material, and to surround this aluminum wire in a conventional cable press with lead cladding. The junction between aluminum and lead cladding is provided by the mechanical contact between them. To improve adhesion, it is desirable to tin the aluminum wires and only then surround them with lead. By using such lead spines with cores and by casting-on the grid yoke, positive tubular electrodes of virtually any desired height can be produced. The open ends at the bottom of the grid are closed off with lead by dipping into molten lead or, alternatively, protected from corrosion by casting end pieces on to them.

By using, for example, an aluminum core of 1.5 millimeter diameter within a lead spine of 3 millimeters outer diameter the resistivity which amounts to 0.0294 ohms per meter for a lead wire of the same diameter, is reduced to 0.011 ohms per meter. Using a copper core, a resistivity of 0.0077 ohms per meter can be reached, that is the electrical resistivity is reduced by 60% with an aluminum core and by 74% with a copper core.

For the same dimensions, the lead wire weighs 78 grams per meter. On the other hand, the lead wire with aluminum core weighs 63.3 grams per meter, and with copper core 74.4 grams per meter. Thus the weight saving amounts to 19% for the aluminum core and 4.6% for the copper core. An aluminum core is preferred because aluminum is both cheaper than copper and because copper may corrode and produce a solution from which copper may become deposited on the negative plate of the storage battery, which is thereby damaged. In contrast, if the lead cladding with aluminum core corrodes, the developing aluminum solution does not settle out on the negative plates.

To accommodate the high discharge currents which prevail in electric traction applications, such as starting currents of up to 5 C* amperes, while maintaining the voltage drop constant from the lower portion of the plate all the way up to the grid yoke, it is desirable to make the grid spines of conical cross section. This also makes it possible to reduce the weight.

* The C rate of a cell is the nominal rate of discharge current for 1 hour to a selected end voltage or the so called nominal 1-hour rate.

The particular advantages of a tubular electrode grid according to the invention reside in the fact that the junction region between the extruded wire and the cast yoke is defect-free even when different lead alloys are used for the two parts. In addition, grids of any desired length can be produced, and any desired lead alloys may be used. In particular, those combinations of antimony-free and antimony-poor portions suitable for the application may be used. A tubular electrode in accordance with the invention is also well suited for mass production, since the manufacturing process described above can be automated.

Referring to FIGS. 3 and 4, these show, respectively, spine and yoke combinations made in accordance with the prior art and in accordance with the present invention.

Each figure shows the area in which a spine 2 joins grid yoke 6a.

In the prior art (FIG. 3) it is conspicuous that a substantial void 12 exists at the base of the spine. This void creates serious weakness at the junction. Moreover, this void can have an opening to the outside. In that case, battery acid can penetrate into the junction and cause rapid corrosion. In contrast, no substantial void is visible at the junction in the inventive structure (FIG. 4). This greatly increases the strength of the resulting grid and also diminishes the corrosion problems.

Partly because of this greater strength, and partly because of the extrusion process through which the spines are made, the grids according to the invention can be made taller than those of the prior art, and specifically in excess of about 1000 mm.

Also in accordance with the invention, the bottom ends of the spines, i.e., the ends which are not joined to the yoke 6a, need not necessarily be closed with lead. In particular, it has been found that for spines made of lead-clad aluminum the bottom ends may be left with the aluminum exposed. A corrosion-resistant film then forms over these exposed ends and it is not necessary to lead-coat them.

We claim:
1. The method of making a tubular electrode which electrode includes an array of grid spines and a yoke joining the ends of said spines through which the electrode current is taken off,
said method comprising the steps of:
 forming a plurality of separate ones of said spines by extruding low antimony-content lead through a die;
 arraying the separate spines to form a grid, with adjacent ends of the different spines protruding into the hollow interior of a casting mold conforming to the shape of the yoke;
 filling the yoke-conforming interior of the mold with liquid low antimony-content lead, thereby to cast the yoke into the protruding spine ends; and
 removing the spine array and cast-on yoke from the mold after hardening.
2. The method of claim 1 wherein
the extruding of the spines includes
 introducing wire of higher electrical conductivity and lower weight than lead through an injection nozzle into a cavity containing the lead in molten state,
 drawing the wire out again through an aperture wider than the injection nozzle, and
 cooling the material emerging from the aperture.
3. The method of claim 1 further comprising
 maintaining the arrayed spines surrounded with material providing heat insulation from the mold during the time the spine ends protrude into the mold interior.
4. The electrode made by the method of claim 1.
5. The electrode made by the method of claim 2.
6. The electrode made by the method of claim 3.
7. An electrode according to claim 4, wherein said spines are at least 1000 mm long.
8. An electrode according to claim 4, wherein said spines are joined to said joke without any substantial voids.
9. An electrode according to claim 4, wherein said spines are formed of a lead alloy having substantially less than 9% antimony by weight.
10. An electrode according to claim 9, wherein said alloy has approximately 3 to 3.5% antimony by weight.
11. The electrode of claim 4, wherein said spines extend into said cast-on yoke to a depth of only about 2 mm.

* * * * *